United States Patent [19]

Adam et al.

[11] Patent Number: 4,736,021

[45] Date of Patent: Apr. 5, 1988

[54] 4-BENZOTHIAZOLYL PHENYL AZO DYES

[75] Inventors: Jean-Marie Adam, Saint-Louis;
Pierre Galafassi, Rixheim, both of France

[73] Assignee: Ciba-Geigy Corporation, Ardsley, N.Y.

[21] Appl. No.: 417,153

[22] Filed: Sep. 13, 1982

Related U.S. Application Data

[63] Continuation of Ser. No. 120,593, Feb. 11, 1980, abandoned.

[30] Foreign Application Priority Data

Feb. 23, 1979 [CH] Switzerland ............. 1843/79

[51] Int. Cl.[4] ............. C09B 44/02; C09B 44/08; D06P 1/41; D21H 1/46
[52] U.S. Cl. ............. 534/612; 62/162; 534/589; 534/603; 534/605; 534/614; 534/741; 534/742
[58] Field of Search ........... 260/154, 156, 158, 146 R, 260/146 D; 534/603, 605, 612, 614

[56] References Cited

U.S. PATENT DOCUMENTS 3,933,787 1/1976 Moser et al. ............. 260/158

FOREIGN PATENT DOCUMENTS 1015163 9/1957 Fed. Rep. of Germany ...... 260/150
1903058 10/1969 Fed. Rep. of Germany ...... 260/158
1965992 1/1971 Fed. Rep. of Germany ...... 260/158
2216286 8/1974 France ............. 260/158

Primary Examiner—Floyd D. Higel
Attorney, Agent, or Firm—Wenderoth, Lind & Ponack

[57] ABSTRACT

There are described azo compounds of the formula

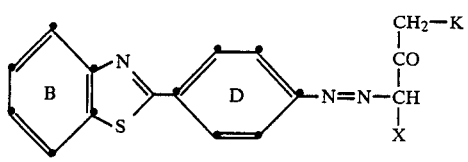

wherein
K is an optionally quaternized basic group,
X is the radical COOR, in which R is an alkyl group or a substituted or unsubstituted phenyl group, or X is the radical CONHR', in which R' is an alkyl group or a substituted or unsubstituted phenyl group; and wherein the benzene rings B and/or D can be further substituted;

and the use thereof as dyes for the dyeing of textile materials, and particularly for the dyeing of paper of all types, especially bleached, lignin-free, unsized paper.

12 Claims, No Drawings

4-BENZOTHIAZOLYL PHENYL AZO DYES

This application is a continuation of application Ser. No. 120,593, filed Feb. 11, 1980, now abandoned.

The invention relates to novel azo compounds, to processes for producing them, and to the use of these novel azo compounds as dyes for the dyeing and printing of textile materials, paper and leather.

The novel azo compounds correspond to the formula I

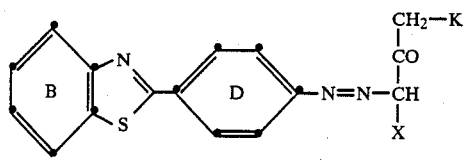

wherein
K is an optionally quaternised basic group,
X is the radical COOR, in which R is an alkyl group or a substituted or unsubstituted phenyl group, or X is the radical CONHR', in which R' is an alkyl group or a substituted or unsubstituted phenyl group; and wherein the benzene rings B and/or D can be further substituted.

When K is a basic group, it is for example the group

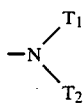

wherein
$T_1$ is hydrogen, or a low-molecular alkyl group ($C_1$-$C_4$) which is unsubstituted or substituted by hydroxyl, or a cyclohexyl group which is unsubstituted or substituted by 1 to 3 methyl groups, or it is a phenyl group; and
$T_2$ is a low-molecular alkyl group ($C_1$-$C_4$) which is unsubstituted or substituted by hydroxyl, and the groups
$T_1$ and $T_2$ together with the N atom can also form a heterocyclic ring, for example a pyrrolidine, morpholine or piperazine ring.

The basic group K is for example one of the following groups:

—N—(CH$_3$)$_2$
—N—(C$_2$H$_5$)$_2$
—NH—CH$_3$
—NH—C$_3$H$_7$

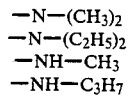

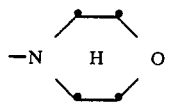

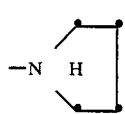

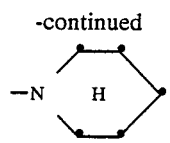

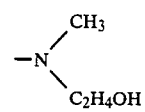

—N—(C$_2$H$_4$OH)$_2$.

When K is a quaternised basic group, it is for example a group of the formula

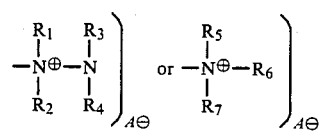

wherein
$R_1$ and $R_2$ independently of one another are each a substituted or unsubstituted alkyl group ($C_1$-$C_4$), or a substituted or unsubstituted cycloalkyl group, or $R_1$ forms with $R_2$ with the inclusion of the N atom a heterocyclic ring;
$R_3$ and $R_4$ independently of one another are each hydrogen, substituted or unsubstituted alkyl ($C_1$-$C_4$), or a substituted or unsubstituted cycloalkyl or aryl group;
$R_5$ is hydrogen, substituted or unsubstituted alkyl ($C_1$-$C_4$), or substituted or unsubstituted cycloalkyl or aryl;
$R_6$ is hydrogen, substituted or unsubstituted alkyl ($C_1$-$C_4$), substituted or unsubstituted cycloalkyl, substituted or unsubstituted alkoxy, or substituted or unsubstituted aryl;
$R_7$ is substituted or unsubstituted alkyl ($C_1$-$C_4$), or substituted or unsubstituted cycloalkyl; or
$R_1$ and $R_3$ and/or $R_2$ and $R_4$ form together with the N atom a heterocyclic ring, or $R_5$ and $R_6$ or $R_5$, $R_6$ and $R_7$ form with the inclusion of the N atom a heterocyclic ring; and
$A^\ominus$ is an anion.

The quaternised group K is for example one of the following groups:

—N(CH$_3$)$_3^\oplus$
—N(C$_2$H$_5$)$_3^\oplus$

—N(C$_2$H$_5$)$_2^\oplus$
 |
 CH$_3$

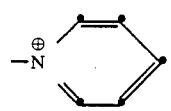
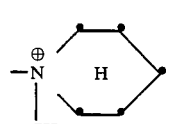
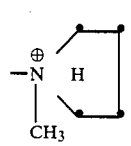

—N(CH$_3$)$_2^\oplus$
 |
 NH$_2$

—N(C$_2$H$_5$)$_2^\oplus$
 |
 NH$_2$

—N(C$_2$H$_4$OH)$_2^\oplus$
 |
 NH$_2$

-continued

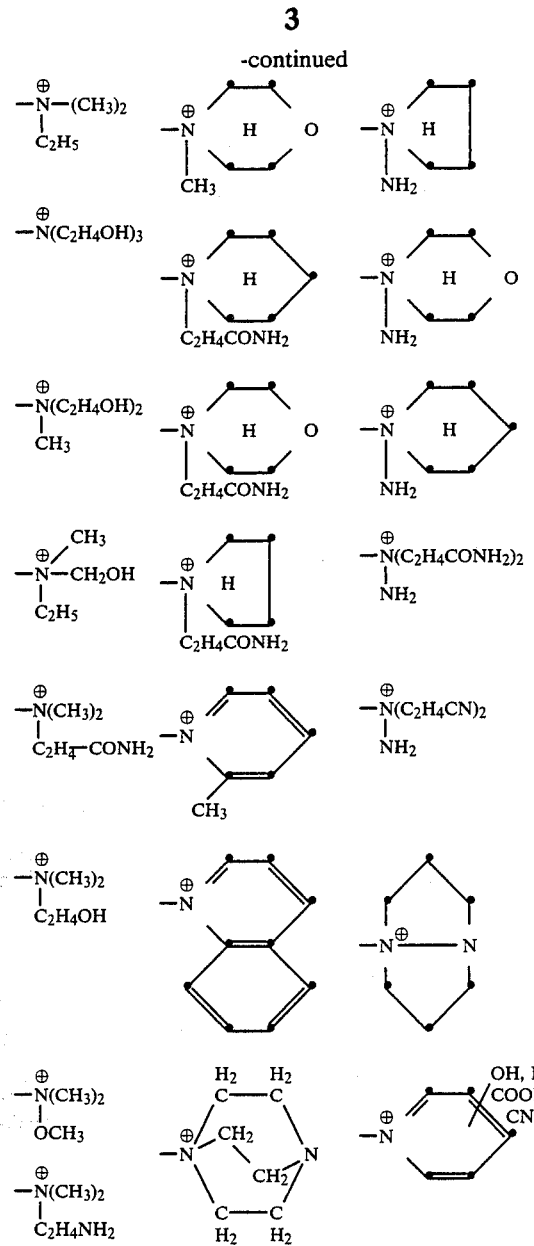

In preferred azo compounds of the formula I, K is a quaternised basic group, and is in particular the pyridinium group.

If X is a COOR group, R is a straight-chain or branched-chain alkyl group having 1 to 4 carbon atoms, such as the methyl, ethyl, n- and iso-propyl or n-, sec- or tert-butyl group, or R is the unsubstituted phenyl group, or a phenyl group which is substituted by for example: alkyl ($C_1$–$C_4$, straight-chain or branched-chain), alkoxy ($C_1$–$C_4$), phenoxy or halogen, such as fluorine, chlorine or bromine.

When X is a CONHR' group, R' is for example: an alkyl group ($C_1$–$C_4$, straight-chain or branched-chain), an unsubstituted phenyl group, or a phenyl group which is mono- or polysubstituted for example by: alkyl ($C_1$–$C_4$, straight-chain or branched-chain); alkoxy ($C_1$–$C_4$); phenoxy; halogen such as fluorine, chlorine or bromine; $NO_2$; CN; $SO_2NH_2$, or $SO_2NH_2$ which is mono- or dialkylated on the N atom; —N=N-aryl, particularly —N=N—$C_6H_5$; —NH-acyl, especially —NHCOCH$_3$; and by hetero groups, such as in particular the benzothiazole group; or the phenyl group R' can be substituted by the group

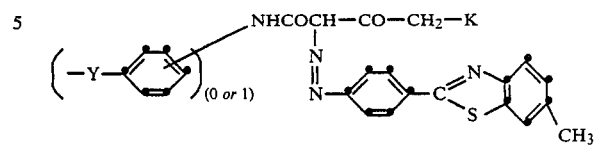

wherein Y is O, S, NH, NHCO or NHCONH$_2$, and K has the given meaning.

In preferred azo compounds of the formula I, X is the radical CONHR', wherein R' is a substituted or unsubstituted phenyl group, particularly a phenyl group substituted by alkoxy.

Where the benzene rings B and/or D are further substituted, possible substituents are in particular: alkyl ($C_1$–$C_4$) straight-chain or branched-chain, such as the methyl, ethyl, n- and iso-propyl or n- and iso-butyl groups; halogen such as fluorine, chlorine or bromine; alkoxy ($C_1$–$C_4$) such as methoxy, ethoxy, propoxy or butoxy; $SO_2NH_2$; $NO_2$; OH and phenyl.

In preferred azo compounds, the benzene ring B is substituted, especially by alkyl, particularly by methyl, and the benzene ring D is not further substituted.

Particularly interesting azo compounds on account of their good build-up correspond to the formula I wherein K is a quaternised basic group, especially the pyridinium group; X is the radical CONHR', wherein R' is a phenyl group which is unsubstituted or substituted by alkoxy; and wherein the benzene ring B is substituted by an alkyl group, and the benzene ring D is not further substituted.

Compared with the nearest comparative dyes chemically, for example those known from the German Patent Specifications Nos. 1,903,058 and 1,965,992, the dyes according to the present invention exhibit a better build-up of dye on the dyed material.

The novel azo compounds of the formula I are obtained for example (a) by coupling a compound of the formula II $$\begin{array}{c} CH_2Cl \\ | \\ CO \\ | \\ CH_2 \\ | \\ X \end{array} \quad (II)$$

with a diazotised amine of the formula III

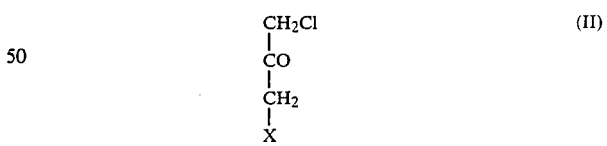

and subsequently reacting the coupling product with an amine to give a basic or cationic compound, and optionally quaternising the basic group; or (b) by reacting a compound of the formula II

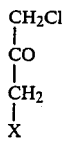

(II)

with an amine to give a basic or cationic compound, and subsequently coupling this with a diazotised amine of the formula III; in all formulae, the symbols X, B and D have the meanings defined under the formula I.

The compounds of the formula II are known, for example from J.A.C.S 62 (1940), p. 1147, and can be produced by $Cl_2$ in a chlorinated solvent, such as carbon tetrachloride, to obtain compounds of the formula $Cl-CH_2-CO-CH_2-COCl$, which are subsequently reacted with an amine $NH_2R'$ or with an alcohol ROH, wherein the symbols R and R' have the meanings given under the formula I.

There are mentioned as compounds of the formula II for example:
4-chloroacetoacetic acid-(4'-methoxy)-benzamide,
4-chloroacetoacetic acid-(2'-methoxy)-benzamide,
4-chloroacetoacetic acid-(2'-nitro)-benzamide,
4-chloroacetoacetic acid-(4'-nitro)-benzamide,
4-chloroacetoacetic acid-(4'-acetylamino)-benzamide,
4-chloroacetoacetic acid-(4'-chloro)-benzamide,
4-chloroacetoacetic acid-(2',4'-dichloro)-benzamide,
4-chloroacetoacetic acid-(4'-dimethylaminosulfonyl)-benzamide,
4-chloroacetoacetic acid-(4'-sulfamido)-benzamide,
4-chloroacetoacetic acid-(4'-monoethylaminosulfonyl)-benzamide,
4-chloroacetoacetic acid-(2'-methyl)-benzamide,
4-chloroacetoacetic acid-(4'-tert-butyl)-benzamide,
4-chloroacetoacetic acid-(2',4'-dimethyl)-benzamide,
4-chloroacetoacetic acid-(2',4',6'-trimethyl)-benzamide,
4-chloroacetoacetic acid-(2'-cyano)-benzamide,
4-chloroacetoacetic acid-(4'-azobenzene)-benzamide, and
4-chloroacetoacetic acid-(4'-[6''-methyl]-benzothiazolyl)-benzamide.

The process variant (a) comprises reacting the compounds of the formula II with an amine of the formula III which has been diazotised in the customary manner, and then exchanging the symbol X in the coupling product for an amine group. If the coupling product is reacted with a primary or secondary amine, for example dimethylamine, there are obtained compounds of the formula I wherein K is a basic group, which can be subsequently converted by quaternisation into cationic compounds; or the coupling product is reacted with a tertiary amine, such as pyridine or trimethylamine, to thus obtain compounds of the formula I wherein K is a cationic group.

The process variant (b) consists of firstly reacting the compound of the formula II with a primary or secondary amine, optionally followed by quaternisation, or reacting the compound with a tertiary amine, with subsequent coupling to a diazotised amine of the formula III.

The amines of the formula III are also known, and can be produced by known methods. An example to be mentioned is 2-(4'-aminophenyl)-6-methylbenzothiazole.

The quaternising reaction and the coupling reaction are likewise performed by known methods.

When the symbol K is a quaternised basic group, suitable anions are: inorganic as well as organic anions, for example anions of halogen such as chloride, bromide or iodide, and of sulfate, methylsulfate, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleinate, acetate, propionate, lactate, succinate, chloroacetate, tartrate, methanesulfonate or benzoate, or complex anions, such as the anion of zinc chloride double salts.

Depending on the type of application of the compounds, preferred anions are for example the acetate and chloride ions (for textile and paper materials).

Quaternisation is performed for example in an inert solvent, such as chlorobenzene, or optionally in an aqueous suspension, with quaternising agents, or without solvent in an excess of the quaternising agent, at a temperature of about 20° to 120° C.

Suitable quaternising agents are for example: alkyl halides, such as methyl or ethyl chloride, methyl, ethyl or butyl bromide, or methyl or ethyl iodide, particularly alkyl sulfates, such as dimethyl, diethyl and dibutyl sulfate, or benzyl chloride, chloroacetic acid amide, acrylic acid ester, epoxides, such as ethylene oxide, epichlorohydrin, alkyl esters of aromatic sulfonic acids, such as methyl-p-toluenesulfonate, methylbenzenesulfonate, as well as the propyl and butyl esters of benzenesulfonic acid.

The novel basic, optionally quaternised, compounds of the formula I are used as dyes for dyeing and/or printing textile materials, paper and leather. If the novel dyes are used for dyeing and/or printing textile materials, suitable such materials are wool, silk and acid modified polyamide materials, and also polyacrylonitrile materials (for example wet tow), and modified polyester material dyeable with basic dyes; also natural and regenerated cellulose materials, such as cotton and viscose, with dyeings being obtained which are characterised by a good build-up of the dye. The dyeings obtained have good fastness properties, particularly good fastness to wet processing, such as fastness to washing, and good fastness to light. Furthermore, it is of advantage that the azo compounds of the formula I according to the invention are absorbed onto these materials without pretreatment of the cellulose materials, and without any supplementary addition of salt to the dye liquor.

A preferred use of the azo compounds of the formula I according to the invention is for dyeing paper of all types, particularly bleached, unsized and sized, lignin-free paper. These compounds are exceptionally suitable for dyeing unsized paper (tissues) by virtue of their very high standard affinity for this substrate.

The azo compounds according to the invention exhaust very well onto these substrates, in the process of which the waste liquors—even with deep shades (up to above 1/1 RT=reference type strength)—are left colourless, a factor which is an outstanding technical and ecological advantage, especially with regard to the present effluent laws. The high degree of exhaustion is also advantageous with regard to obtaining good reproducibility of shade. The exhaustion degree is virtually unaffected by the hardness of the water. The paper dyeings are fast to wet treatment, that is to say, they display no tendency to bleed when dyed paper in the wet state comes into contact with moist white paper. This property is particularly desirable for so-called "tissues", in the case of which it is foreseeable that the dyed paper in the wet condition (for example soaked with water, alcohol, tenside solution, and so forth) will come into contact with other surfaces, such as textiles, paper, and the like, which have to be protected from becoming contaminated.

The high affinity for paper and the high rate of exhaustion of the azo dyes according to the invention are of great advantage in the continuous dyeing of paper, and thus render possible a wide field of application.

The invention is further illustrated by the following Examples without being limited by them. The temperature values are given in degrees Centigrade, 'parts' are parts by weight, and percentage values are percent by weight.

EXAMPLE 1

24 parts of 2-(4'-aminophenyl)-6-methylbenzothiazole are diazotised in the customary manner. The suspension of the diazo compound is then introduced into an alcoholic solution of 24.2 parts of 4-chloroacetoacetic acid-(4'-methoxybenzamide) (obtainable by chlorination of diketene and acylation of the resulting 4-chloroacetoacetic acid chloride with 4-methoxy-aniline, according to J. Amer. Chem. Soc. 1940, 62, 1147) and 20 parts of sodium acetate. After completion of coupling, the compound of the formula

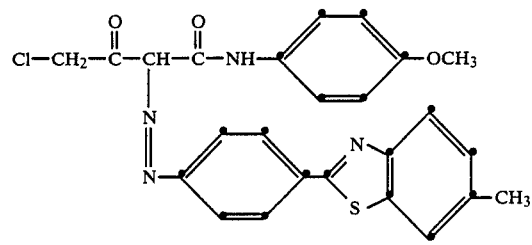

is filtered off with suction and dried.

10 parts of the monoazo compound thus obtained are introduced into 50 parts of pyridine, and the mixture is heated for 1 hour at 80°. The precipitated dye of the formula

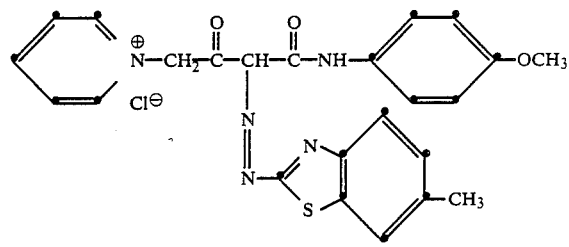

exhausts completely onto paper, and the light-yellow dyeings have a good level of fastness.

If in the above Example the 10 parts of the monoazo compound from diazotised 2-(4'-aminophenyl)-6-methylbenzothiazole and 4-chloroacetoacetic acid-(4'-methoxybenzamide) are replaced with equivalent parts of the monoazo compounds listed in the following Table, and these aminated with pyridine, the procedure being otherwise the same, there are obtained cationic dyes of which the shade of colour on paper is given in each case in the last column of the Table.

TABLE monoazo compound

| Example | X | Shade on paper |
|---|---|---|
| 2 | —CONH—⟨C₆H₄⟩—OCH₃ | yellow |
| 3 | —CONH—⟨C₆H₄⟩—NO₂ | yellow |
| 4 | —CONH—⟨C₆H₄⟩—NO₂ | yellow |

TABLE-continued

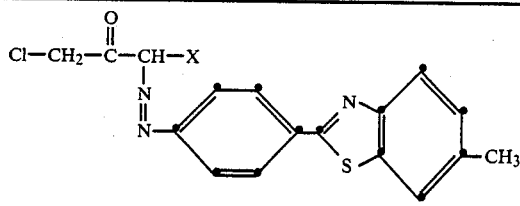

monoazo compound

| Example | X | Shade on paper |
|---|---|---|
| 5 | —CONH—C₆H₄—NHCOCH₃ (para) | yellow |
| 6 | —CONH—C₆H₄—Cl (para) | yellow |
| 7 | —CONH—C₆H₃(Cl)—Cl (2,4-dichloro) | yellow |
| 8 | —CONH—C₆H₄—SO₂N(CH₃)₂ (para) | yellow |
| 9 | —CONH—C₆H₄—SO₂NH₂ (para) | yellow |
| 10 | —CONH—C₆H₄—SO₂NHC₂H₅ (para) | yellow |
| 11 | —CONH—C₆H₄—CH₃ (ortho) | yellow |
| 12 | —CONH—C₆H₄—C₄H₉(tert) (para) | yellow |
| 13 | —CONH—C₆H₃(CH₃)—CH₃ (2,5-dimethyl) | yellow |
| 14 | —CONH—C₆H₂(CH₃)₂—CH₃ (2,4,5-trimethyl) | yellow |

TABLE-continued

[Structure: Cl—CH₂—C(=O)—CH(X)—N=N—C₆H₄—(2-benzothiazolyl with CH₃)]

monoazo compound

| Example | X | Shade on paper |
|---|---|---|
| 15 | —CONH—(phenyl with CN) | yellow |
| 16 | —CONH—C₆H₄—N=N—C₆H₅ | reddish yellow |
| 17 | —CONH—C₆H₄—(2-benzothiazolyl with CH₃) | reddish yellow |
| 18 | —CONH—C₆H₄—O—C₆H₅ | yellow |

EXAMPLE 19

Seven parts of the monoazo compound according to Example 1 are stirred in 200 parts of a 40% aqueous dimethylamine solution for 4 hours at 40°. The isolated basic dye of the formula $$(CH_3)_2N-CH_2-\underset{\underset{N=N-Ar}{|}}{\overset{O\ H\ O}{\overset{\|}{C}-\overset{|}{C}-\overset{\|}{C}}}-NH-C_6H_4-OCH_3$$

is soluble in diluted acetic acid.

EXAMPLE 20

When 10 parts of the monoazo compound according to Example 1 are introduced into a 40% aqueous trimethylamine solution, and the bath is heated at 40° for 6 hours, there is obtained a cationic yellow dye of the formula

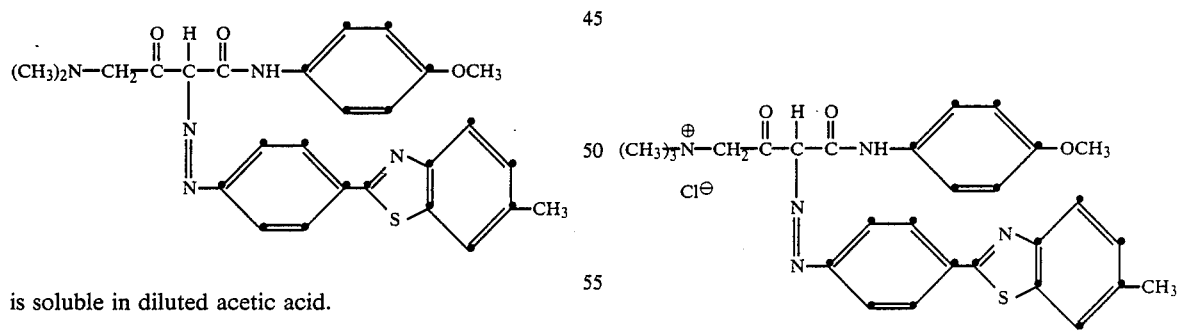

which has good properties on paper.

If in the above Example the trimethylamine is replaced by triethylenediamine or by N,N-dimethylethanolamine or by N,N-dimethylhydrazine, similar dyes having equally good properties are obtained.

EXAMPLE 21

48 parts of 2-(4'-aminophenyl)-6-methylbenzothiazole are diazotised in the usual manner. The suspension of the diazo compound is then introduced into an alcoholic solution of 34.5 parts of N,N'-bis-4-chloroacetoacetyl-p-phenylenediamine (obtained by chlorination of diketene and acylation of the resulting 4-chloroacetoacetic acid chloride with p-phenylenediamine) and 40 parts of sodium acetate. After complete coupling, and quaternisation in pyridine according to Example 1, there is isolated the dye of the formula

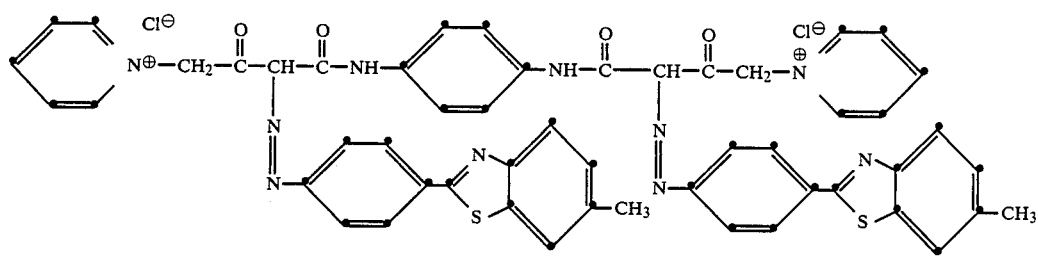

which exhausts completely on paper and has a very high level of fastness.

EXAMPLE 22

50 parts of chemically bleached beech sulfite are mixed with 50 parts of bleached sulfite RKN 15 (freeness value 20° SR) and 2 parts of the dye of the formula

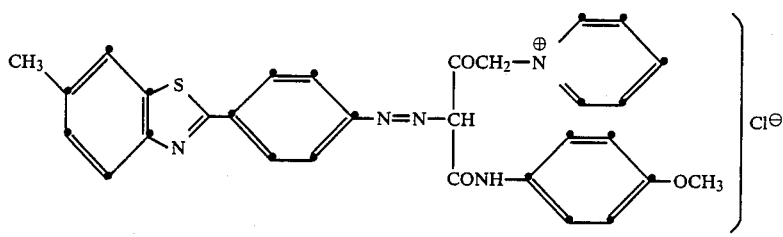

in water (pH 6, water hardness 10° dH, temperature 20°, ratio of goods to liquor 1:40). After 15 minutes' stirring, paper sheets are produced on a Franck sheet-former. The paper is dyed in a very intense, reddish-yellow, brilliant shade having fastness to light. The degree of exhaustion attains 100%. The waste liquor is completely colourless.

EXAMPLE 23

The procedure is carried out as in Example 22, using however in this case 2 parts of the known dye

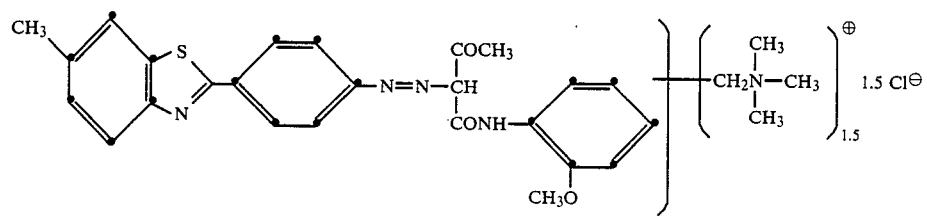

(U.S. Pat. No. 3,933,787)

The paper is dyed in a greenish yellow shade. The degree of exhaustion scarcely attains 65%. The wasteliquor is deeply coloured.

What is claimed is:
1. An azo compound of the formula

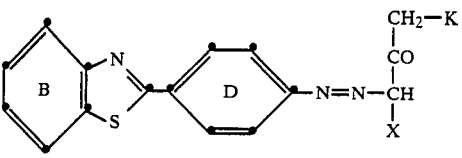

wherein
K is

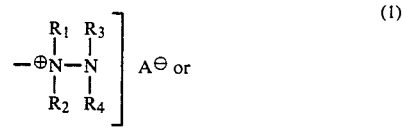 (1)

or

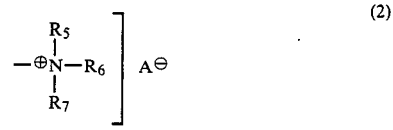 (2)

wherein
$R_1$ and $R_2$ independently are $C_1$-$C_4$ alkyl, $C_1$-$C_4$ hydroxyalkyl, $C_1$-$C_4$ cyanoalkyl, $C_1$-$C_4$ carbamoylalkyl or $R_1$ and $R_2$ together with the nitrogen to which they are attached form pyrrolidyl, morpholinyl or piperidyl, $R_3$ and $R_4$ represent hydrogen, or $R_1$ together with $R_3$ represents —CH$_2$—CH$_2$—CH$_2$— and $R_2$ together with $R_4$ represents —CH$_2$—CH$_2$—CH$_2$, $R_5$ is hydrogen, $C_1$-$C_4$ alkyl or $C_1$-$C_4$ hydroxyalkyl, $R_6$ is hydrogen, $C_1$-$C_4$ alkyl, $C_1$-$C_4$ hydroxyalkyl, or $C_1$-$C_4$ alkoxy, $R_7$ is $C_1$-$C_4$ alkyl or $C_1$-$C_4$ hydroxyalkyl, $C_1$-$C_4$ carbamoylalkyl or $C_1$-$C_4$ aminoalkyl, or $R_5$ and $R_6$ together with the nitrogen to which they are attached form pyrrolidinyl, morpholinyl or piperidinyl, or $R_5$ and $R_6$ and $R_7$ together with the nitrogen to which they are attached form pyridinium, methylpyridinium, hydroxypyridinium, aminopyridinium, carboxypyridinium, cyanopyridinium,

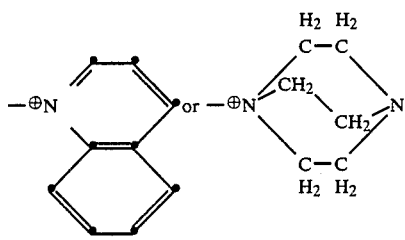

and $A^\ominus$ is an anion, X is —COOR or —CONHR' wherein R is $C_1$-$C_4$ alkyl, phenyl or phenyl substituted by $C_1$-$C_4$ alkyl, $C_1$-$C_4$ alkoxy, phenoxy or halogen, and R' is $C_1$-$C_4$ alkyl, phenyl or phenyl substituted by at least one $C_1$-$C_4$ alkyl, $C_1$-$C_4$ alkoxy, phenoxy, halogen, NO$_2$, CN, SO$_2$NH$_2$, —N=N—phenyl, —NHCOCH$_3$, benzothiazolyl group, or by the group

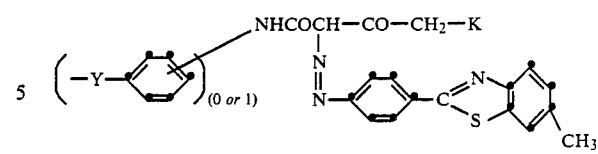

wherein Y is O, S, NH, NHCO or NHCONH$_2$ and K is as defined above, and wherein the benzene rings B and D are unsubstituted or at least one of said rings is substituted by $C_1$-$C_4$ alkyl, halogen, $C_1$-$C_4$ alkoxy, SO$_2$NH$_2$, NO$_2$, OH or phenyl.

2. An azo compound according to claim 1, wherein K is the pyridinium group.

3. An azo compound according to claim 1, wherein X is the radical CONHR'.

4. An azo compound according to claim 3, wherein R' is a substituted or unsubstituted phenyl group.

5. An azo compound according to claim 4, wherein R' is a phenyl group substituted by $C_1$-$C_4$ alkoxy.

6. An azo compound according to claim 1, wherein the benzene ring B is substituted by at least one of $C_1$-$C_4$ alkyl, halogen, $C_1$-$C_4$ alkoxy, SO$_2$NH$_2$, NO$_2$, OH or phenyl.

7. An azo compound according to claim 6, wherein the benzene ring B is substituted by $C_1$-$C_4$ alkyl.

8. An azo compound according to claim 7, wherein the benzene ring B is substituted by methyl.

9. An azo compound according to claim 1, wherein the benzene ring D is not further substituted.

10. An azo compound according to claim 1, wherein X is the radical CONHR', the benzene ring B is substituted by $C_1$-$C_4$ alkyl, and the benzene ring D is not further substituted.

11. An azo compound according to claim 10, wherein K is the pyridinium group, and X is the radical CONHR', in which R' is a phenyl group which is substituted or unsubstituted by $C_1$-$C_4$ alkoxy.

12. The azo compound according to claim 1 of the formula

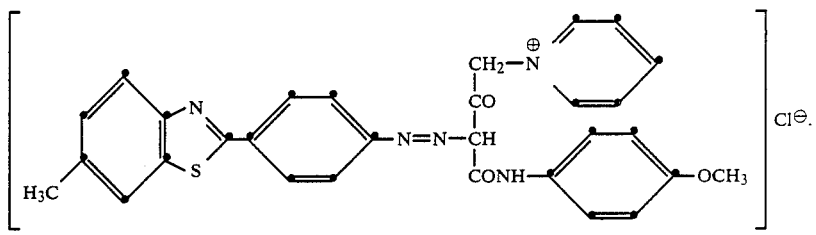

* * * * *